SELF-CLEANING DEVICE FOR ROTARY TELEVISION SET TUNERS

Filed Feb. 6, 1970

INVENTOR.
DAVID E. GURKIN

BY

Ernest H Schmidt

ATTORNEY.

United States Patent Office 3,613,149
Patented Oct. 19, 1971

3,613,149
SELF-CLEANING DEVICE FOR ROTARY TELEVISION SET TUNERS

David E. Gurkin, 3165 SW. 18th St., Miami, Fla. 33145

Filed Feb. 6, 1970, Ser. No. 9,154
Int. Cl. H03j 3/00
U.S. Cl. 15—256.51 2 Claims

ABSTRACT OF THE DISCLOSURE

A resilient brush member is described for application against the longitudinally-extending sets of electrical contact points of tuner strips in a rotary drum tuner for brush-cleaning the points as the tuner is rotated during use while changing from channel to channel. In one form, the brush is supported by the tuner drum housing and support structure, and in another embodiment the brush is in the form of a layer of resilient brush material fixed against the inside of the tuner assembly cover and adapted to press against the contact points when the cover is fitted in place on the housing and support structure.

This invention relates to television tuners and is directed particularly to self-cleaning devices for the electrical contacts of rotary drum or barrel television set channel changers or tuners.

Present day television set channel tuners, for the most part, are in the form of rotary drums or barrels having peripherally-spaced, longitudinally-extending tuned strips, one set for each signal channel. Each tuning strip set comprises a tuned circuit for its particular signal channel, circuit connections of which terminate in contact points or buttons along the strip which engage with a corresponding number of resilient, fixed contact arms supported by the tuner housing for electrical interconnection with the remainder of the signal input circuitry for receiving that particular channel. Because the electrical circuits associated with the strips operate at very high frequency signal and oscillator voltages, their circuit parameters are of a very critical nature. For this reason, contact resistance between the switched contact points and their associated fixed contact arms must be kept to an absolute minimum for efficient circuit operation and consequent peak set performance. Notwithstanding measures taken to preserve low contact resistance at the selected tuned strips of such television tuners, however, such as encasing the rotary barrel in a dust-proof cover, utilizing gold or silver-plated contact points and the like, poor contact resistance with attendant impairment of performance is a common disorder of television sets which have been in service for any substantial length of time. Such faulty operation was heretofore cured temporarily by spraying or injecting a contact cleaning fluid into the contact switching mechanism, or by disassembling the tuner and physically cleaning all the various contact points and their associated fixed contact arms.

It is the principal object of this invention to obviate the above-described deficiencies of rotary contact television tuners by the provision of mechanism for automatically wipe-cleaning the contact points of the tuned strips each time the tuner drum is rotated in channel changing during use of the television set. By the use of the wiping mechanism, vapor deposits from the air, dust, oxides and other deposit films are wiped away before they can build up to impair the contact resistance at the tuner switches.

A more particular object is to provide a self-cleaning mechanism for television tuners of the character described wherein a cleaning brush or the like is resiliently pressed longitudinally against the outer periphery of the tuner drum so as to simultaneously wipe all the contact points of one or more tuned strip rows as the tuner is switched from channel to channel during operation of the television set.

Still another object of the invention is to provide a self-cleaning mechanism of the above nature wherein the contact wiping member forms part of the tuner drum enclosing cover, while at the same time presenting no difficulty or obstruction if it should become necessary to disassemble the tuner for repair.

Yet another object of this invention is to provide a self-cleaning mechanism for tuners as is herein above described which can readily be applied to existing rotary tuners without difficulty and at minimal expense.

Other objects, features, and advantages of the invention will be apparent from the following description when read with reference to the accompanying drawings. In the drawings, wherein like reference numerals denote corresponding parts throughout the several views.

Figure 1:
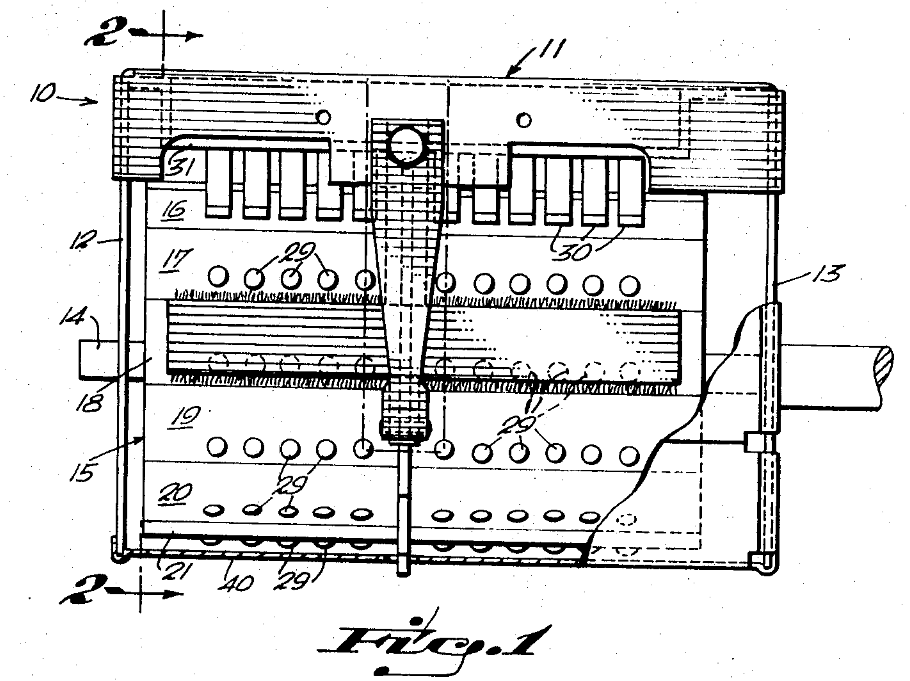
FIG. 1 is an elevational view, with a portion of the cover shown broken away to illustrate interior construction, of a typical rotary drum or barrel television set tuner embodying the invention.

Referring now in detail to the drawings, reference numeral 10 in FIG. 1 designates a typical rotary tuner for television sets, equipped with a self-cleaning device embodying the invention. The tuner assembly 10 comprises a housing structure 11 having spaced, parallel end plates 12 and 13 journalling opposite ends of portions of a tuner drive shaft 14. The drive shaft 14 carries a rotary tuner drum 15 fitted with a plurality of peripherally-arranged, longitudinally-extending tuned strips 16 through 18 each of which is provided, along its length, with a plurality of aligned contact points 29. The contact point sets 29 of each of the tuned strips 16 through 28 are adapted to switch or make electrical contact with a like plurality of fixed contact arms 30 arranged in a longitudinal row and fixed with respect to the housing structure 11 such as by an insulating support member 31 (see FIG. 2). It will be understood that the contacts of the individual tuned strips 16 through 28 make selective contact with the cooperative fixed contact arms 30 depending upon the rotary position of the rotary tuner drum 15, whereby tuning to the desired reception channel is achieved by turning the drive shaft 14 from one position to another. To this end, mechanical detent means in the form of a circular detent cam 32 is concentrically arranged at a central position along the rotary tuner drum 15, which detent cam is cooperatively engaged about its periphery by a cam follower wheel 33 journalled at the outer end of a cam wheel leaf spring 34. The inner end of the spring 34 is affixed to a side wall portion 35 of the tuner housing as by a machine screw 36. As best illustrated in FIG. 2, the detent cam 32 is formed about its periphery with a plurality of arcuate recesses 37, equal in number to the number of tuned strips 16 through 28 (13 in the embodiment illustrated), to provide detent or yieldable locking-in of the turned rotary tuner drum 15 at a selected channel position whereat the fixed contact arms 30 are in full contact with the contact points of the corresponding tuned strips.

Figure 2:
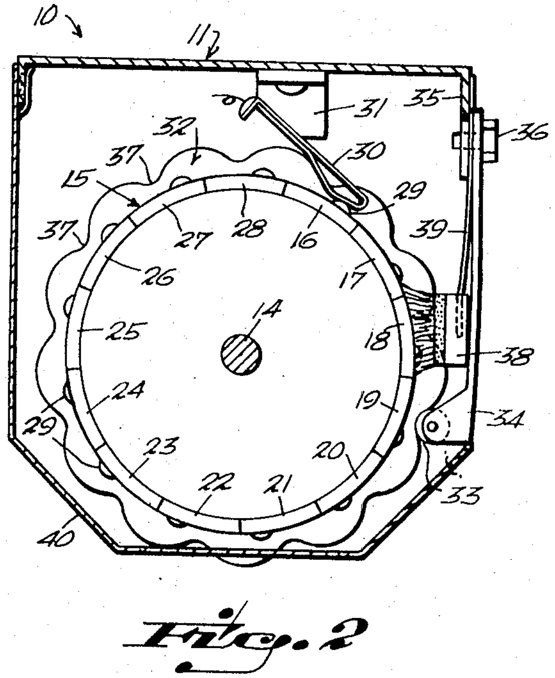
FIG. 2 is a transverse cross-sectional view taken on the line 2—2 of FIG. 1 in the direction of the arrows.

Referring now to the embodiment of the invention illustrated in FIGS. 1 and 2, the self-cleaning device is in the form of an elongated brush 38 resiliently pressed against and along an outside portion of the rotary drum 15 by means of a leaf-spring 39 extending outwardly of said brush and secured at its distal end to the housing structure 11. To this end, the leaf-spring 39 may conveniently be secured with respect to the housing by attaching it with the same machine screw 36 that supports the detent spring 34. As illustrated in FIG. 1, the brush 38, which will preferably be fabricated with medium-stiff nylon bristles, for example, extends sufficiently along the length of the rotary drum 15 to include all contact points in any given tuned strip in its wiping action. An important advantage of this form of the invention resides in the fact that it can be readily applied as an attachment device to television tuners of ordinary construction. In operation, simultaneous wiping of the tuned strip contact sets as the tuner drum is rotated upon channel changing prevents the build-up of contact films and dirt, thereby keeping contact resistance at low values consistent with efficient tuner operation. The usual sheet metal electrical shield and cover plate 40, which can readily be removed for installation of the wiping brush 38, provides additional protection against the entrance of dust and fumes.

Figure 3:
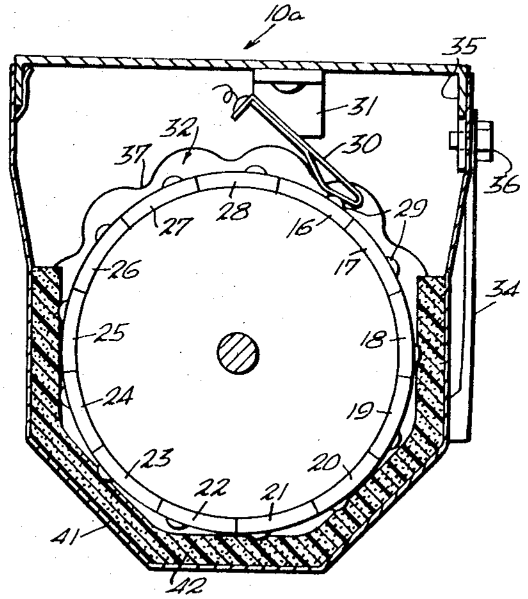
FIG. 3 is a transverse cross-section similar to that of FIG. 2 but illustrating a modified form of the invention wherein the wiping mechanism is part of the tuner housing cover member.

In the embodiment 10*a* of the invention illustrated in FIG. 3, the interior surface of the electrical shield and cover plate 40 is used to support a thick, resilient layer 42 of synthetic sponge material or the like, used as the contact wiping member. To this end, the cover plate 40 will preferably be so shaped as to surround a substantially semi-circular portion of the rotary drum 15 in closely-spaced relation, the thickness of the wiper sponge 42 being such that when said cover plate is assembled in place on the housing structure, surface portions of said wiper layer will be resiliently pressed against certain ones of the tuned strip contact point sets to wipingly clean them as the rotary drum is turned during channel changing.

While I have illustrated and described herein only two forms in which my invention can conveniently be embodied in practice, it is to be understood that these forms are given by way of example only and not in a limiting sense. The invention, in brief, comprises all the modifications and embodiments coming within the scope and the spirit of the following claims.

What I claim as new and desire to secure by Letters Patent is:

1. A contact cleaning attachment device for television tuners of the type comprising a tuner housing member, a rotary drum journalled in said housing member and having peripherally-spaced, longitudinally-extending tuned strips, one set for each channel to be tuned, and a set of resilient contact arms fixed at one end with respect to the tuning housing member and adapted to make selective contact with electrical contact points on the strips as the drum is turned in tuning; comprising, in combination, a wiping member, and means for supporting said wiping member in abutment against and along an outer surface portion of said drum to wipe against contact points of said tuned strips other than those being selectively contacted as the rotary drum is turned during channel changing, said wiping member support means comprising a cover member removably attachable to the tuner housing member and having interior surface portions in closely spaced relation with respect to peripheral surface portions of the rotary drum, said wiping member comprising a thick layer of resilient wiping material secured against said interior surface portions of said cover member and being of such thickness as to resiliently press against the tuned strip contact points when said cover member is fitted in place with respect to the tuner housing member.

2. A contact cleaning attachment device for television tuners as defined in claim 1 wherein said wiping member is of a synthetic sponge material.

References Cited

UNITED STATES PATENTS

| | | | |
|---|---|---|---|
| 1,584,033 | 5/1926 | Kannenberg | 15—97 R |
| 3,227,981 | 1/1966 | Krepps, Jr., et al. | 325—452 X |

LEON G. MACHLIN, Primary Examiner

U.S. Cl. X.R.

200—179; 334—47